United States Patent [19]

Braden, Jr.

[11] 3,847,222

[45] Nov. 12, 1974

[54] TREATMENT OF AN UNDERGROUND FORMATION CONTAINING WATER-SENSITIVE CLAYS

[75] Inventor: William B. Braden, Jr., Houston, Tex.

[73] Assignee: Texaco Inc., New York, N.Y.

[22] Filed: Oct. 29, 1973

[21] Appl. No.: 410,721

[52] U.S. Cl. ................................ 166/303, 166/272
[51] Int. Cl. ............................................ E21b 43/24
[58] Field of Search .......... 166/272, 303, 274, 273, 166/305 R

[56] References Cited
UNITED STATES PATENTS

| | | | |
|---|---|---|---|
| 3,064,732 | 11/1962 | Bernard et al. | 166/305 R |
| 3,236,306 | 2/1966 | Atwood | 166/305 R |
| 3,360,043 | 12/1967 | Braden Jr. et al. | 166/272 |
| 3,444,931 | 5/1969 | Braden, Jr. | 166/303 X |
| 3,610,338 | 10/1971 | Harnsberger | 166/272 |
| 3,621,913 | 11/1971 | Braden, Jr. | 166/272 |
| 3,710,863 | 1/1973 | Webster et al. | 166/272 |

*Primary Examiner*—Stephen J. Novosad
*Attorney, Agent, or Firm*—Thomas H. Whaley; C. G. Ries

[57] ABSTRACT

Method of treating an underground formation containing water sensitive clays and sand to stabilize and/or improve same employing a prescribed volume of steam followed by contact with a guanidine salt in a prescribed type of hydrocarbon solvent.

10 Claims, No Drawings

TREATMENT OF AN UNDERGROUND FORMATION CONTAINING WATER-SENSITIVE CLAYS

The present invention relates to the treatment of sand or sandstone-containing formations. More particularly, this invention relates to a method of treating underground formations containing water sensitive clays and sand or sandstone-like materials to stabilize the decrease in water permeability of sand or sandstone on contact with water and in addition, to improve the water permeability of such water damaged formations.

In modern day production of oil from underground formations it has become fairly common practice to apply secondary recovery techniques to an oil-containing formation in order to recover therefrom additional quantities of oil. Among the methods employed in secondary recovery operations mention is made of water flooding, steam injection, gas flooding and combinations thereof. One of the most serious problems encountered in secondary recover operations with water flooding or steam injection procedures in sand or sandstone bodies is that the underground oil containing formation also often contains water sensitive clays and/or mobile fines associated therewith. Treatment of such a formation with water or steam generally results in dispersing the clays or fines within the sand or sandstone, with the concomitant result that the water permeability of a formation is materially decreased. The decrease in the water permeability of the formation to water results in the loss of the oil contained therein from being recovered by secondary recovery operations.

It is known from commonly assigned U.S. Pat. No. 3,360,043 that the clay containing bodies can be treated to improve the water and/or steam permeability of clay by contact with guanidine salt, such as guanidine hydrochloride in a polar oxygenated aliphatic hydrocarbon solvent of a prescribed type, namely a lower alkanol, dimethylsulfoxide, a mixture of dimethyl sulfoxide and dioxane or a mixture of lower alkanols.

It has now been found that a water sensitive sand or sandstone containing formation can be effectively treated to improve the water permeability of the sand prior to water contact or after damage by water by first contacting the water sensitive or water damaged sand with saturated or supersaturated steam in an amount of about 0.01 to 10 percent thereof per pore volume at a temperature of from about 220° to 1600° F., and a superatmospheric pressure, and then contacting the treated sand with a prescribed class of guanidine salts provided that the salt is dissolved in a polar organic solvent, namely a polar oxygenated aliphatic hydrocarbon solvent selected from the group consisting of a lower alkanol, dimethyl sulfoxide, a mixture of dimethylsulfoxide and dioxane or a mixture of lower alkanols. It has been found that treatment of an underground water sensitive sand containing formation by the method of this invention, namely with steam followed by contact with a solution of the prescribed class of guanidine salts in such a polar oxygenated aliphatic hydrocarbon solvent materially increases the permeability of the sand or sandstone containing formation to subsequent water treatment and, in addition, that treatment in accordance with the method of the present invention also restores the water permeability of formations which have been previously damaged by contact with water.

The prescribed class of guanidine salts useful in the present invention include the hydrogen halides such as the guanidine hydrochloride, guanidine hydrobromide and guanidine nitrate, guanidine acetate and mixtures thereof.

The method of the present invention has particular applicability in secondary recovery operations wherein water flooding or steam injection is employed as the secondary driving force to recover the oil from the formation. In such a secondary recover operation, for example, water flooding, the injection water is introduced into the formation through an injection well under pressure and forced out into the oil containing formation. The pressure maintained on the water injected into the formation displaces or forces the oil to move toward the producing well which is located relatively distant from the injection well. At the producing well the driven oil is recovered by conventional means.

In carrying out the method of the present invention it has been found desirable to first inject the steam component into the water sensitive or water damaged sandcontaining formation until the sand located adjacent to the wellbore of the injection well has been contacted, then to inject the prescribed class of guanidine salts in the specified polar oxygenated aliphatic hydrocarbon solvent into the formation from the injection well and to maintain the injected guanidine salt solution in contact with the sandy portion of the underground formation for a period of time such as from about 1 to about 7 days to effect stabilization of the sandy section. Thereafter, the secondary recovery injection fluid can be introduced into the formation in a conventional manner which is well known in the art.

In the steam treating step used in method of the present invention the steam component is employed in an amount of about 0.01 to 10 percent by volume per pore volume of the water sensitive sand being treated. Amounts above this range are not considered beneficial for economic reasons.

The temperature and pressure ranges for this steam treatment step are desirably about 200° to 1600° F., preferably 250° to 750° F. and pressures of about 14.7 to 8000 psia, preferably 50 to 4,000 psia.

In the treatment of the underground formation by the present invention, methanol has been found to be an effective solvent since it is relatively low in cost and easily available.

Following is a description by way of example of the treating method of the invention. A plug obtained from a Berea sandstone core was used as the test plug. This plug, measuring 2.2 centimeters in length and 2.2 centimeters in diameter after being cleaned in a conventional manner was found to have a pore volume of 1.43 ml and a porosity of 17.1 percent. Its initial permeability to nitrogen was 54.7 millidarcies (md.) and to 10 percent sodium chloride in distilled water was 22.6 md.

The plug was treated with distilled water and thereafter its water permeability was determined to be 7.1 md. This base permeability for the water damaged core is equated to 100 percent in the subsequent tests. The resulting water damaged core was treated in the following manner.

EXAMPLE 1

A

The above water damaged core was injected with 2.8 pore volumes of steam (measured as water at ambient temperature) at 100 psia and 350° F., at a flow rate of 5 ml. per hour (as water). The permeability of the core was found to be 20.3 md. representing a 186 percent increase over the permeability of the water damaged core.

B

The resulting treated core was further treated by injecting 10.5 pore volumes of distilled water therethrough at a flow rate of 50 ml./hr. and a pressure of 1,000 psia. The permeability of the treated core was found to be 13.3 md., an 88 percent increase over the base permeability but a decrease in the value obtained after steam treatment of 98 percentage points.

C

This core was further treated with a 10 percent weight solution of guanidine hydrochloride in methanol until 54.5 pore volumes thereof had been injected. The flow rate was 50 ml. per hr. at 1,000 psia. The final permeability amounted to 15.8 md., a 123 percent increase over the base permeability. This represents a gain of 35 percentage points over the value obtained in Example 1-B.

D

Thereafter, three successive water treatments of this treated core resulted in the injection of 208 pore volumes of distilled water therethrough at flow rates of 50 ml. per hr. and pressures of 1,000 psia. The final permeability was 13.9 md., representing a 96 percent increase in the permeability of the damaged core.

Inspection of the above test results shows that the steam treatment (Example 1-A) increased the permeability of the damaged core by 186 percent but that subsequent treatment with only 10.5 pore volumes of water (Example 1-B) reduced the permeability to only an 88 percent increase over the base permeability, a loss of 98 percent from the value of the steam treated core. This decrease in permeability found in Example (1-B) after only 10.5 pore volumes of water injection shows that the steam treatment alone is not effective in maintaining a core's permeability.

Example (1-C) illustrating treatment with guanidine hydrochloride in methanol, shows that the decreasing permeability of the core following water treatment of Example (1-B) can be stabilized by the method of this invention.

Further evidence of the efficacy of the combination treatment of steam followed by guanidine hydrochloride is found in Example 1-D wherein the subsequent injection of 208 pore volumes of water resulted in the core's permeability being maintained at 96 percent above its damaged permeability.

COMPARATIVE EXAMPLE A

This example serves to demonstrate that treatment of a water damaged core by guanidine hydrochloride in methanol alone is not effective in improving the damaged state permeability of a sandstone core. Essentially the same procedure as used in Example 1 was employed in this comparative example. This procedure differs from the one used in Example 1 in that this test temperature was carried out at 152° F. whereas the other tests were conducted at 350° F. However, this difference is not considered to be significant with respect to the results thereby achieved.

The water permeability of the sandstone core was assigned its damaged state permeability of 100 percent. Thereafter the core was treated by injection of 145 pore volumes of guanidine hydrochloride in methanol at a flow rate of 50 ml. per hour and a pressure of 1,000 psia. Following this treatment 68 pore volumes of distilled water were injected into the core. The permeability was found to be essentially the same as that of the damaged core, i.e., no substantial improvement was observed.

In carrying out the practice of the present invention one may employ in place of the dry steam another hot, dry gas, such as, for example, air, nitrogen, methane, carbon dioxide and the like, including mixtures thereof. Use of one or more of the above alternate gases is preferred in those instances where there is a likelihood that the use of steam would result in condensation within the formation, with a resultant damage to the formation.

Obviously, many modifications and variations of the invention as hereinbefore set forth may be made without departing from the spirit and scope thereof, and, therefore, only such limitations should be imposed as are indicated in the appended claims.

I claim:

1. A method of treating a water-sensitive sandcontaining formation to improve the water permeability of the sand portion which comprises in combination injecting into said formation and into contact with said sand portion thereof, at an elevated temperature and a superatmospheric pressure, steam in an amount sufficient to provide from about 0.1 to about 10 percent by volume thereof per pore volume of said sandy portion of the formation, thereafter injecting into said formation and into contact with the resulting treated sand portion from about 5 to about 20 percent by weight of a guanidine salt in a polar oxygenated aliphatic hydrocarbon solvent, and maintaining said guanidine salt in contact with the sand portion of the formation for a time period sufficient to effect stabilization of said sand portion.

2. A method as claimed in claim 1 wherein said guanidine salt is guanidine hydrochloride.

3. A method as claimed in claim 1 wherein said guanidine salt is guanidine acetate.

4. A method as claimed in claim 1 wherein the polar oxygenated aliphatic hydrocarbon is a lower alkanol.

5. A method as claimed in claim 4 wherein the lower alkanol is methanol.

6. A method as claimed in claim 4 wherein the lower alkanol is ethanol.

7. A method as claimed in claim 1 wherein the polar oxygenated aliphatic hydrocarbon solvent is an admixture of methanol and ethanol.

8. A method of recovering oil from an oil-bearing underground formation containing a water sensitive sand portion, wherein a displacement fluid is applied to said formation and oil is recovered therefrom which comprises first contacting said sand at an elevated temperature and pressure with from about 0.01 to about 10 percent by volume, per pore volume of said sand portion, of steam to effect water removal therefrom, then bringing a treating solution consisting of guanidine salt in a polar oxygenated aliphatic hydrocarbon solvent into contact with said treated sand portion for a time period sufficient to stabilize the sandy portion against water sensitivity and thereafter introducing a displacement fluid into said formation under pressure to force said treating solution through the formation and recovering oil from said formation.

9. A method as claimed in claim 8 wherein said guanidine salt is guanidine hydrochloride.

10. A method as claimed in claim 8 wherein the polar oxygenated aliphatic hydrocarbon solvent is a lower alkanol.

* * * * *